United States Patent
Ong (10) Patent No.: US 8,051,470 B2
(45) Date of Patent: Nov. 1, 2011

(54) CONSOLIDATION OF USER DIRECTORIES

(75) Inventor: Peng T. Ong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1998 days.

(21) Appl. No.: 10/617,607

(22) Filed: Jul. 11, 2003

(65) Prior Publication Data

US 2004/0117665 A1    Jun. 17, 2004

Related U.S. Application Data

(63) Continuation-in-part of application No. 10/383,419, filed on Mar. 6, 2003, now abandoned.

(30) Foreign Application Priority Data

Dec. 12, 2002 (SG) .............................. 200207526-5

(51) Int. Cl.
*G06F 7/04* (2006.01)
(52) U.S. Cl. .............................................. 726/6; 726/18
(58) Field of Classification Search ..................... 726/17, 726/21; 713/170
See application file for complete search history.

(56) References Cited

U.S. PATENT DOCUMENTS

| | | | |
|---|---|---|---|
| 5,721,781 A * | 2/1998 | Deo et al. ......................... | 705/67 |
| 6,000,606 A | 12/1999 | Dethloff | |
| 6,006,333 A | 12/1999 | Nielsen | |
| 6,079,021 A | 6/2000 | Abadi et al. | |
| 6,122,741 A | 9/2000 | Patterson et al. | |
| 6,178,511 B1 | 1/2001 | Cohen et al. | |
| 7,114,075 B1 * | 9/2006 | Yasuda et al. .................. | 713/182 |
| 2002/0138763 A1 * | 9/2002 | Delany et al. .................. | 713/201 |
| 2003/0163513 A1 * | 8/2003 | Schaeck et al. ............... | 709/201 |
| 2004/0013132 A1 * | 1/2004 | Cotte ............................ | 370/466 |
| 2004/0059590 A1 | 3/2004 | Mercredi et al. | |
| 2006/0037066 A1 | 2/2006 | Audebert | |

FOREIGN PATENT DOCUMENTS

| | | |
|---|---|---|
| CA | 2395374 | 6/2001 |
| CA | 2395381 | 6/2001 |
| EP | 0546584 A1 | 6/1993 |
| GB | 2349960 A | 11/2000 |
| WO | WO 98/26540 * | 6/1998 |

(Continued)

OTHER PUBLICATIONS

Sandhu, Ravi S et al., "Access Control: Principles and Practice", IEEE Communications Magazine, IEEE Service Center, 1994, pp. 40-48.

Supplementary European Search Report dated Mar. 30, 2010 for Application No. EP03812748, 4 pages.

(Continued)

*Primary Examiner* — Nasser Moazzami
*Assistant Examiner* — Carlton Johnson
(74) *Attorney, Agent, or Firm* — Stephen J. Walder, Jr.; Jeffrey S. LaBaw (57) ABSTRACT

A method for automatic user authentication is described. In response to a coupling of a separate hardware security device to a data processing system, credential information for each of a plurality of applications that the user uses is received from the separate hardware security device into an authentication credential container associated with the user. A plurality of applications accessible by a user are identified by examining authentication credential container of the user. A view of the plurality of applications accessible by the user is generated. The view is a consolidated user directory that contains user authentication information across the plurality of applications. The view may then be displayed to an administrator.

17 Claims, 7 Drawing Sheets

| FOREIGN PATENT DOCUMENTS | | |
|---|---|---|
| WO | WO 00/26866 | 5/2000 |
| WO | WO 01/16879 A1 | 3/2001 |
| WO | WO 01/44949 A2 | 6/2001 |
| WO | WO 01/52023 A2 | 7/2001 |
| WO | WO 01/67705 A2 | 9/2001 |

OTHER PUBLICATIONS

Communication pursuant to Article 94(3) EPC dated Feb. 9, 2011 for Application No. 03 812 747.8-1245, 7 pages.

* cited by examiner

| Users | Keys | Applications | Servers | | Feedback | Help |

Peirce, Jennifer I.

Keys   Profile   Certificate-Enabled Applications   Enterprise Applications   Personal Applications   User Log

Keys

| Type | Serial number | Other |
|---|---|---|
| USB | 4192-3981-3038-2619 | Issues: 16-Dec-2002; Color: Blue |
| Software | 9000-6193-5387-6562 | Issues: 16-Dec-2002; Expires: 30-Dec-2002 |

[ Recovered key expires in 2 days ▼ ]   [ Authorize Key Recovery ]

Profile

Role:
[ End User ▼ ]

Name:
[ Pierce, Jennifer I. ]

E-mail address:
[ jen_pierce ]

Department:
[ Sales ]

Employee ID:
[ P0577 ]

Additional, attributes
[ Select an attribute ▼ ]
[                            ]

[ Update Profile ]   [ Reset Form ]

Certificate-Enabled Applications

| Application | User name | Last logon attempt |
|---|---|---|
| Microsoft Outlook | ☐ jen_pierce | 12-Dec-2002 09:59:14 |
| SAP R/3 | ☐ pierceji | 13-Dec-2002 10:32:47 |
| [ Select an application ▼ ] | [           ] | [ Add User Name ] |

[ Delete User Name ]   [ Select All ]   [ Select None ]

Enterprise Applications

| Application | User name | Last logon attempt |
|---|---|---|
| Lotus Notes | Jennifer Pierce/Sales/ABC | 02-Dec-2002 16:45:02 |

Personal Applications

| Application | Number of accounts |
|---|---|
| eBay | 1 |
| New York Times | 1 |
| QuickBooks Pro | 0 |
| Yahoo! Mail | 2 |

FIG. 7

CONSOLIDATION OF USER DIRECTORIES

This application is a Continuation-in-part of U.S. patent application Ser. No. 10/383,419, filed Mar. 6, 2003 now abandoned and hereby claims the foreign priority benefit under 35 U.S.C. 365(b) of corresponding Singapore Patent Application Serial No. 200207526-5, filed Dec. 12, 2002 and corresponding PCT Application PCT/SG03/00114, filed May 16, 2003.

FIELD OF THE INVENTION

The present invention pertains to the field of secure networks and computing devices. More particularly, the present invention relates to automatic user authentication.

BACKGROUND OF THE INVENTION

With rapid growth of Internet and networks, the popularity of Internet technology rises among users of network services. In order to provide secure access to network services, user names and passwords are utilized to authenticate the user logging into a system providing particular network services. Users may accesses several applications, each with its own separate authentication mechanism causing the user to remember multiple user names and passwords. Due to this inconvenience users usually utilize the same user name and password for multiple applications that they access. In addition, users choose easy to remember passwords, which usually are easy to crack by hackers. Cracking of one password for an account breaches other accounts with the same user name and password. Network setups such as wireless Local Area Networks, remote access features, and weak intrusion protection increase vulnerability of passwords to technical attacks by hackers.

Many hackers are able to trick users by posing as system administrators causing the users to voluntarily provide the hackers with their passwords and user names.

Due to multiple accounts and multiple passwords that users maintain, password management for system administrators becomes a tedious and sometimes burdensome task. Resetting forgotten and compromised passwords, disabling all accounts of a departing employee are examples of tasks that system administrators need to perform in order to manage passwords of existing accounts in the system. Inaccurate password management may lead to security breaches, such as failing to delete a password of a fired employee may allow that employee to access network areas that that employee should not be accessing anymore.

Further, even if passwords are correctly managed, using passwords correctly for authenticating users is fundamentally vulnerable to various attacks from anywhere on the Internet. One of the best ways to lower the population of potential attackers is to use a certificate-based authentication mechanism with private keys stored on physical tokens. The process of transitioning from password-based authentication to token/certificate-based authentication is a complex process. However, it is a transition process that all enterprises serious about digital security need to undertake.

What is needed, therefore, is a solution that overcomes these and other shortcomings of the prior art.

SUMMARY OF THE INVENTION

A method and apparatus for automatic user authentication are described. The method may include identifying a plurality of applications accessible by a user by examining authentication credential container of the user. The method may also include generating a view of the plurality of applications accessible by the user.

BRIEF DESCRIPTION OF THE DRAWINGS

The present invention is illustrated by way of example and not limitation in the figures of the accompanying drawings, in which like references indicate similar elements.

DETAILED DESCRIPTION

A method and apparatus for user authentication is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The present invention discloses a method and system for authenticating user via physicalization of user credentials. Passwords and usernames of a user are stored in a device and automatically provided to corresponding applications that the user is attempting to access.

It will be appreciated that the term "playback", as used herein, means automatically inserting stored user authentication information into appropriate applications. The term "client machine", as used herein, means a processing system hosting a Secure Object for Convenient Identification. [LBK1]

Related Technology

Introduction to related technology may be helpful in understanding some embodiments of the invention.

One embodiment of the invention utilizes Simple Object Access Protocol (SOAP). SOAP is a message-based protocol based on Extensible Markup Language (XML) for accessing services on the Web. SOAP employs XML syntax to send text commands using HTTP.

One embodiment of the invention utilizes HyperText Transfer Protocol Secure (HTTPS). HTTPS is a protocol for accessing secure Web servers. Using HTTPS in a Uniform Resource Locator (URL) instead of HTTP directs the message to a secure port number rather than to a default port number.

Exemplary Architecture

Figure 1:
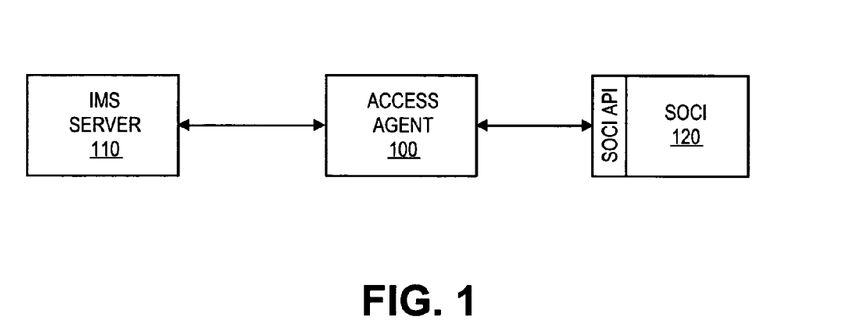
FIG. 1 illustrates an exemplary system architecture according to one embodiment of the invention.
Figure 2:
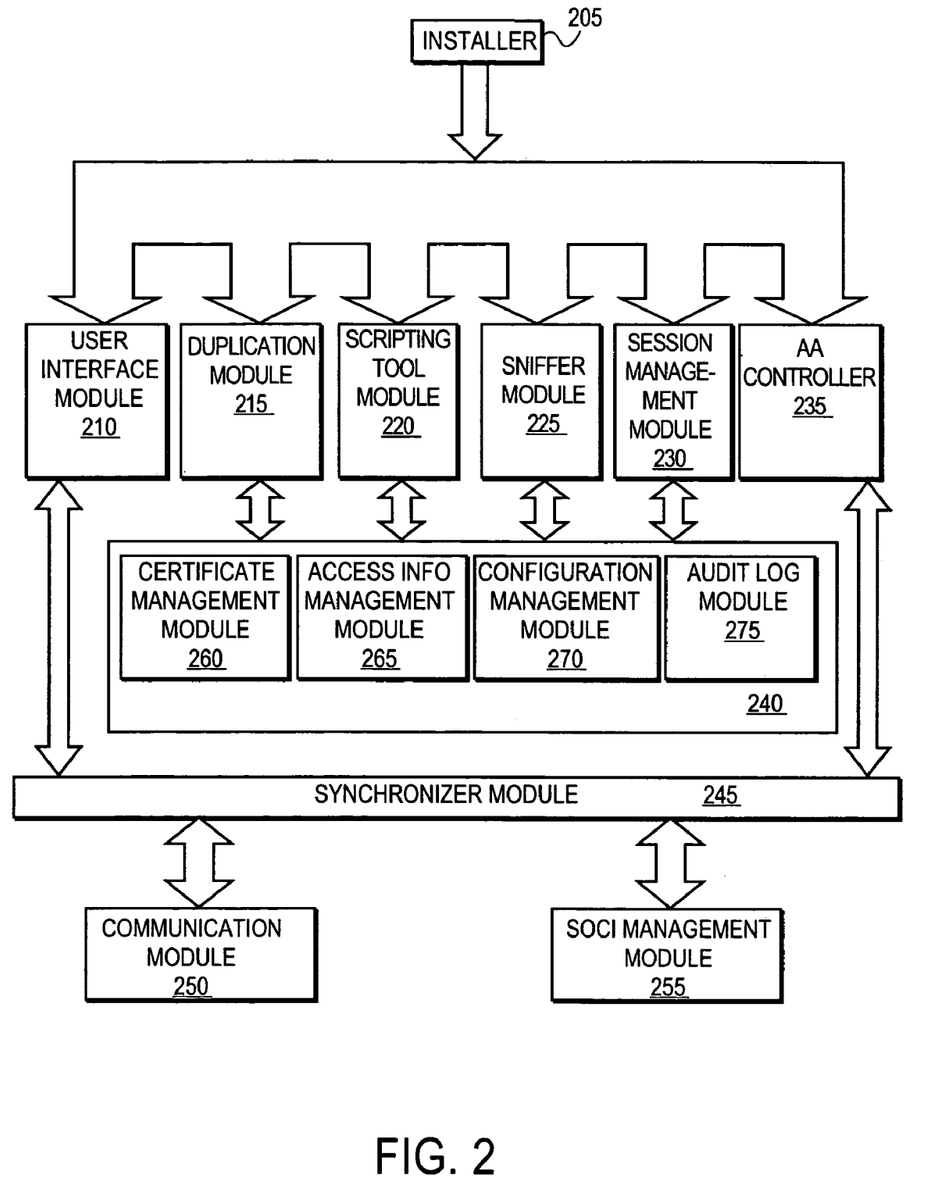
FIG. 2 illustrates components of an Access Agent according to one embodiment of the invention.

FIG. 1 illustrates an exemplary architecture of the invention. An Access Agent 100 communicates with Identity Management System (IMS) 110 via SOAP or HTTPS. IMS is located on a server machine. In addition, the Access Agent 100 interfaces with Secure Object for Convenient Identification (SOCI) device 120 via SOCI Application Program Interface functions. FIG. 2 illustrates components of the Access Agent 100. In one embodiment the Access Agent 200 includes an installer 205, which installs the Access Agent 200 on a client machine hosting the SOCI. The Access Agent 200 includes a user interface module 210, which provides the end user with a graphical interface allowing management of the Access Agent's functions. The Access Agent 200 also includes a duplication module 215 that allows the user to perform duplication of the SOCI, description of which will be apparent from the following discussion. The Access Agent 200 may comprise a scripting tool module 220, which provides the end users with a mechanism to write new scripts to be utilized by the Access Agent 200 for managing passwords for new applications. A sniffer module 225 may also be included in the Access Agent 200 to capture user behavior and play back user authentication information. The Access Agent 200 also includes a session management module 230 to replace graphical authentication interface in the system and provide session management control on the client machine. An Access Agent controller (AA controller) 235 ensures a proper startup of the Access Agent 200 upon an insertion of SOCI into the client machine. The Access Agent 200 also includes a data management module 240. The data management module 240 includes Certificate Management Module 260, Access Info Management Module 265, Configuration Management Module 270 and Audit Log Module 275. Certificate Management Module 260 manages data related to digital certificates such as parsing the certificate and generating a certificate request. The Access Info Management Module 265 manages data related to application access such as extracting user identification and password information. The Configuration Management Module 270 manages data related to configurable parameters of Access Agent. The Audit Log Module 275 manages logging of activities of the Access Agent for audit purposes. The Access Agent 200 also includes a synchronization module 245, communication module 250 and SOCI management module 255, functions of which will also be apparent from the following discussion.

Figure 3:
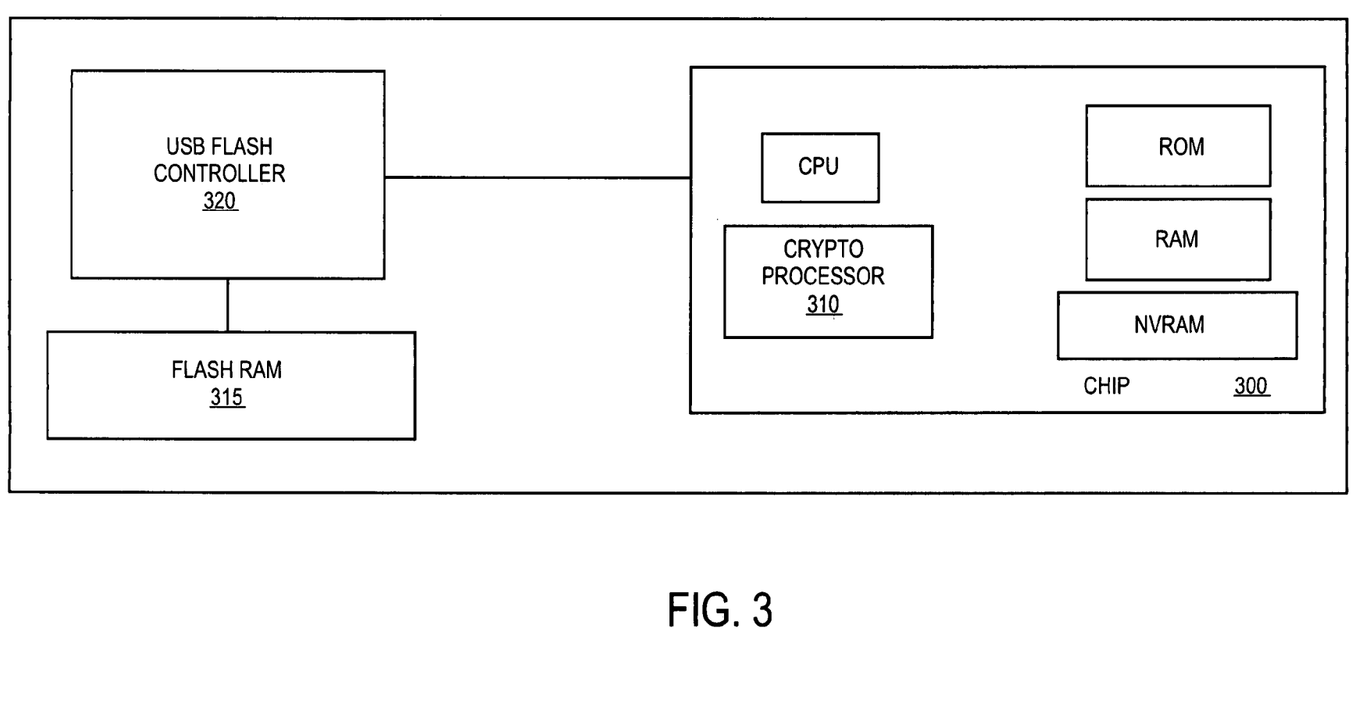
FIG. 3 illustrates components of a Secure Object for Convenient Identification according to one embodiment of the invention.

FIG. 3 illustrates an exemplary architecture of the SOCI according to an embodiment of the invention. The SOCI is a hardware token capable of being connected to the user's computer. The SOCI includes a chip 300. The chip 300 may be a smart card chip. The chip 300 includes a crypto processor 310 that performs cryptographic calculation described below. Cryptographic calculations include symmetric key, asymmetric key and hash algorithms such as RSA, DES, 3DES, SHA1 and MD5, all of which are well known in the art and do not require any further explanation. In addition, the chip 300 includes NVRAM to store sensitive private data, such as private keys. The SOCI also includes Flash RAM 315 to store software drivers and non-sensitive data such as user configuration data, digital certificates, etc. The USB Flash controller 320 is another component of the SOCI. The USB Flash controller provides access from the client computer, i.e. SOCI host computer, to the Flash RAM storage 315 and the chip 300. The SOCI includes Application Interface Functions via which the client computer communicates with the SOCI. The Application Interface Functions provide high-level abstraction for SOCI services, such as certificate management, data encryption/decryption, and digital signature generation. The functions exposed by the Application Programming Interface may be implemented by a SOCI Runtime Library (not shown). In one embodiment, the SOCI stores its authentication information to be provided to the Access Agent in a certificate signed by Certificate Authority (CA) trusted by the Access Agent. The Certification Authority (CA) is an entity entrusted to issue certificates asserting that the recipient individual, machine or organization requesting the certificate fulfills the conditions of an established policy. Certificates together with private keys may be utilized in SOCI to authenticate the user.

Figure 4:
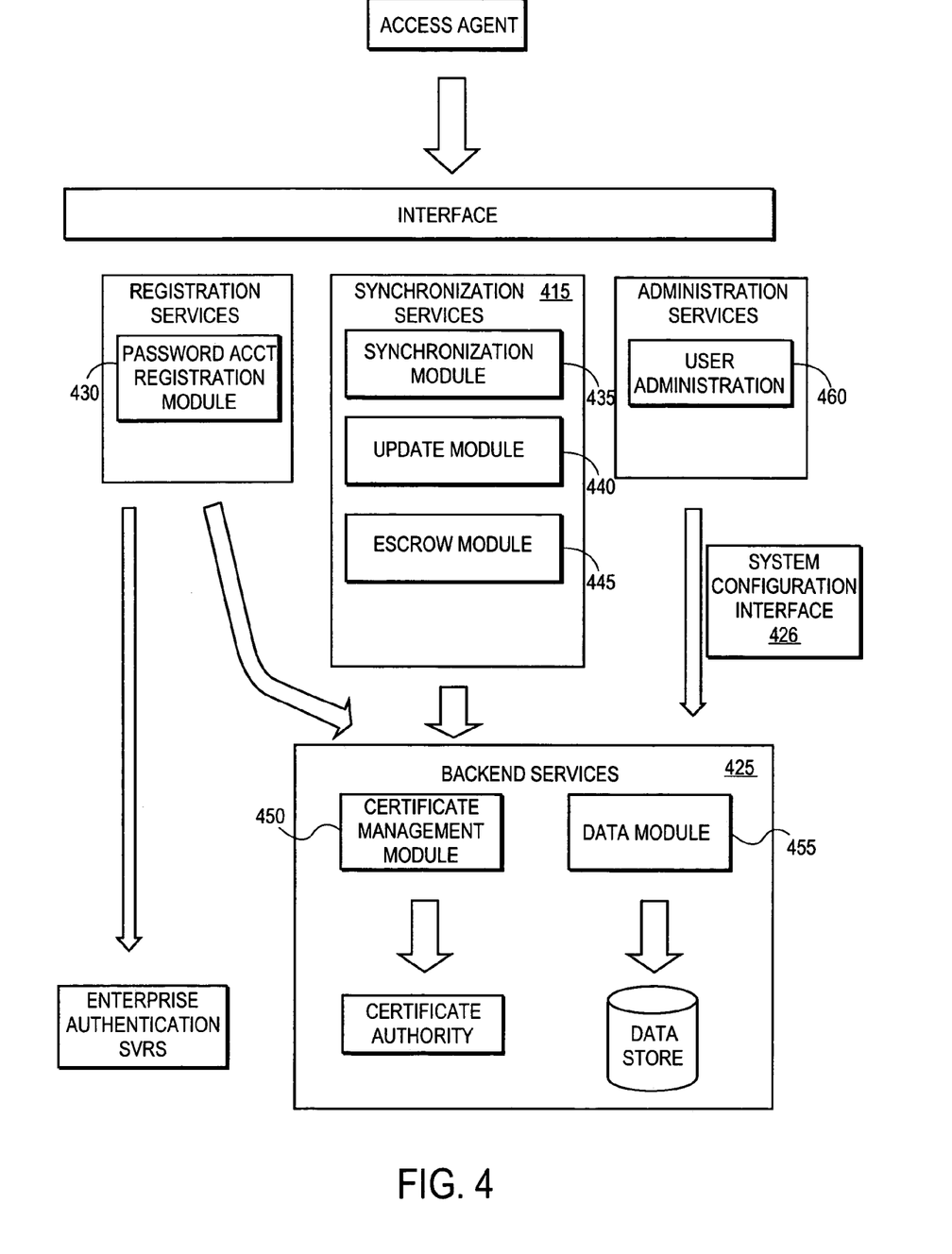
FIG. 4 illustrates components of Identity Management System according to one embodiment of the invention.

FIG. 4 illustrates the Identity Management System (IMS) 400 that is located on a server machine and communicates with the client machine that hosts the SOCI according to one embodiment of the invention. The Identity Management System includes registration services module 410, synchronization services module 415, administration services module 420 and backend services module 425. In addition, the IMS 400 includes a system configuration interface 426 allowing system operators to access administration services and backend services. In one embodiment the interface is an HTML interface. The registration services module 410 includes account registration module 430, which registers a particular SOCI with the IMS. Once the SOCI is registered, the IMS may start provide services to the user of the SOCI. In addition, the account registration module 430 performs enterprise identity registration and email address registration. During the enterprise identity registration, the Access Agent provides IMS with existing credentials of an enterprise identity such as user identification and password information. IMS confirms the information by contacting the enterprise server and upon confirmation, IMS issues a certificate and registers the user in IMS database. During the email address registration, Access Agent provides IMS with an email address, upon receipt of which, the IMS sends an email message using the provided email address requesting identity verification. Once identity verification is received by the IMS, the IMS issues a certificate and registers the user in the IMS database.

The synchronization services module 415 includes synchronization module 435, update module 440 and escrow module 445. The synchronization module 435 synchronizes data on SOCIs with a copy on the IMS in order to maintain consistency between the data. The update module 440 updates software and data on the SOCI by downloading it to the SOCIs via the client machine hosting the SOCIs. For example, the update module 440 may download software upgrades, access scripts for common applications, administrator-maintained client configuration, etc. The escrow module 445 stores sensitive information on behalf of users for future recovery. The escrow module 445 stores the Common Symmetric Key (CSK) in an encrypted form. In a situation where all SOCIs are lost and data is not recoverable from any of these devices, the encrypted data stored in IMS can be recovered by restoring CSK from the escrow module 445. The escrow module 445 may keep the CSK of the SOCI in an encrypted form that is recoverable when IMS's private key is provided to the escrow module 445 and the user presents a predetermined password phrase. CSK is an encryption key used to encrypt user's authentication information such as user's passwords. Every SOCI device that belongs to the same user has the same CSK so that information encrypted by on SOCI can be decrypted by another SOCI belonging to the same user.

The backend services module 425 includes certificate management module 450 and data module 455. Certificate management module 450 issues new certificates, revokes certificates and maintains Certificate Revocation Lists (CRLs) for certificate validity verification. The data module 455 provides other IMS modules with access to the data stored in IMS databases. IMS database may reside in Relations Database Management System (RDBMS), directory server or a simple file system. The databases contain information about SOCI devices that the user owns, such as serial number and issued certificate. The databases may also include information about the user, such as applications that the user accesses, encrypted passwords and configuration data.

The administration services module 420 includes user administration module 460. The user administration module 460 allows the administrator of the system to create new user accounts, delete existing accounts, assign roles to users, i.e. specify users with administration authorization, bind users to accounts, i.e. email accounts. In addition, the administration module 460 allows the administrators to configure SOCIs before distribution, create new key pairs, i.e. public and private keys, revoke existing certificates and keys. Generation of public and private key pairs may be performed in SOCIs. Public keys can then be stored in a certificate issued by IMS. Theses certificates, together with private keys stored in SOCI can be used to authenticate SOCI to IMS in order to retrieve data. In addition, certificates along with private keys may also be used to authenticate user to applications that utilize certificate-based authentication mechanisms.

Figure 6:
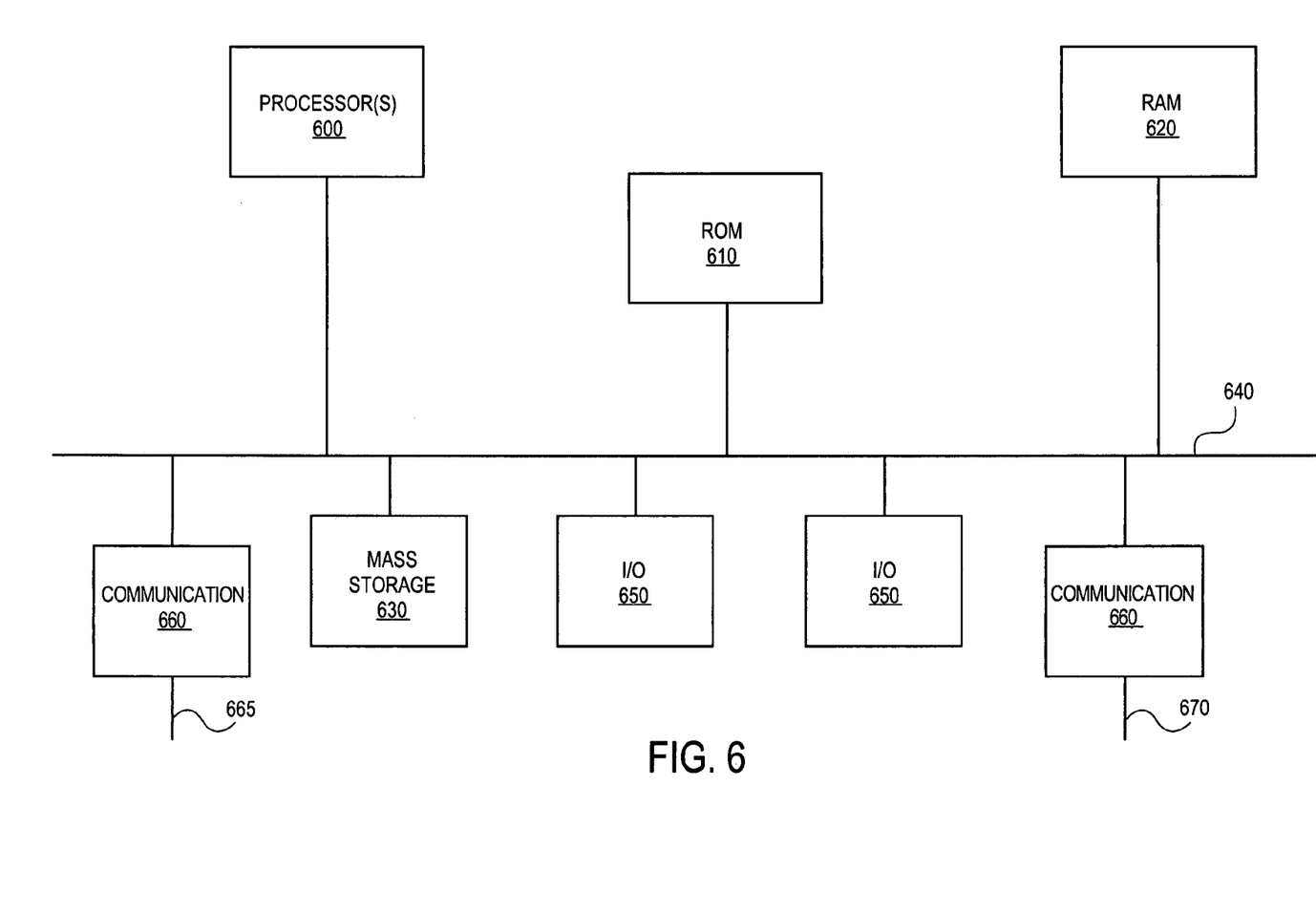
FIG. 6 is an exemplary architecture of a processing system according to one embodiment of the invention.

The physical processing platforms that embody the Access Agent and IMS may include processing systems such as conventional personal computers (PCs) and/or server-class computer systems according to various embodiments of the invention. FIG. 6 illustrates an example of such a processing system at a high level. The processing system of FIG. 6 includes one or more processors 600, read-only memory (ROM) 610, random access memory (RAM) 620, and a mass storage device 630 coupled to each other on a bus system 640. The bus system 640 includes one or more buses, which may be connected to each other through various bridges, controllers and/or adapters, which are well known in the art. For example, the bus system 640 may include a 'system bus', which may be connected through an adapter to one or more expansion, such as a peripheral component interconnect (PCI) bus or an extended industry standard architecture (EISA) bus. Also coupled to the bus system 640 are a the mass storage device 630, one or more input/output (I/O) devices 650 and one or more data communication devices 660 to communicate with remote processing systems via one or more communication links 665 and 670, respectively. The I/O devices 650 may include, for example, any one or more of a display device, a keyboard, a pointing device (e.g., mouse, touchpad, trackball), an audio speaker.

The processor(s) 600 may include one or more conventional general-purpose or special-purpose programmable microprocessors, digital signal processors (DSPs), application specific integrated circuits (ASICs), or programmable logic devices (PLD), or a combination of such devices. The mass storage device 630 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 660 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, or the like.

Methodology

With theses concepts in mind embodiments of the invention can be further explored.

Startup Procedure

In order for a user to be automatically authenticated for each application that the user attempts to access, the Access Agent 200 can be executing on the user's machine, i.e. client machine. The startup procedure will be described with reference to FIG. 5. At 510 the session management module 225 is executed upon the boot up of the client machine. The session management module 225 interacts with a logon procedure of the operating system to handle initialization procedures. The initialization procedures are the following. The session management module invokes the AA controller 235. Upon initialization, the AA controller 235 at 520 directs the session management module 230 to start a thread, which may poll USB ports of the client machine. The polling thread identifies whether an SOCI is present in any of the USB ports. If the polling thread does not identify the SOCI, the session management module 230 at 525 prompts the user to insert the SOCI and awaits for the insertion of the SOCI by periodically polling the USB ports. If the polling thread identifies that SOCI is already connected to the USB port or if the new SOCI has been inserted, the session management module 230 displays a dialogue box prompting the user for a personal identification number (PIN). Upon the user entering the PIN, the session management module 230 at 535 invokes the SOCI management module 255 to verify the entered PIN. If the PIN is successfully verified the SOCI management module 255 provides the session management module 230 with the operating system login and password information of the user at 540. For example, if the client machine is running Windows Operating System, the SOCI management module 255 provides the session management module 230 with Windows Login ID and Windows Password. In one embodiment the operating system login identification and password data are encrypted and stored in the SOCI and retrieved by the SOCI management module 255 via SOCI APIs. The user may have several operating system login identifications and passwords and in this case the user may be presented with a pull down menu to select the login ID and password for the current session. At 545 upon determining and decrypting the login ID and password, the session management module 230 inserts the ID and password into the operating system logon procedure.

Figure 5:
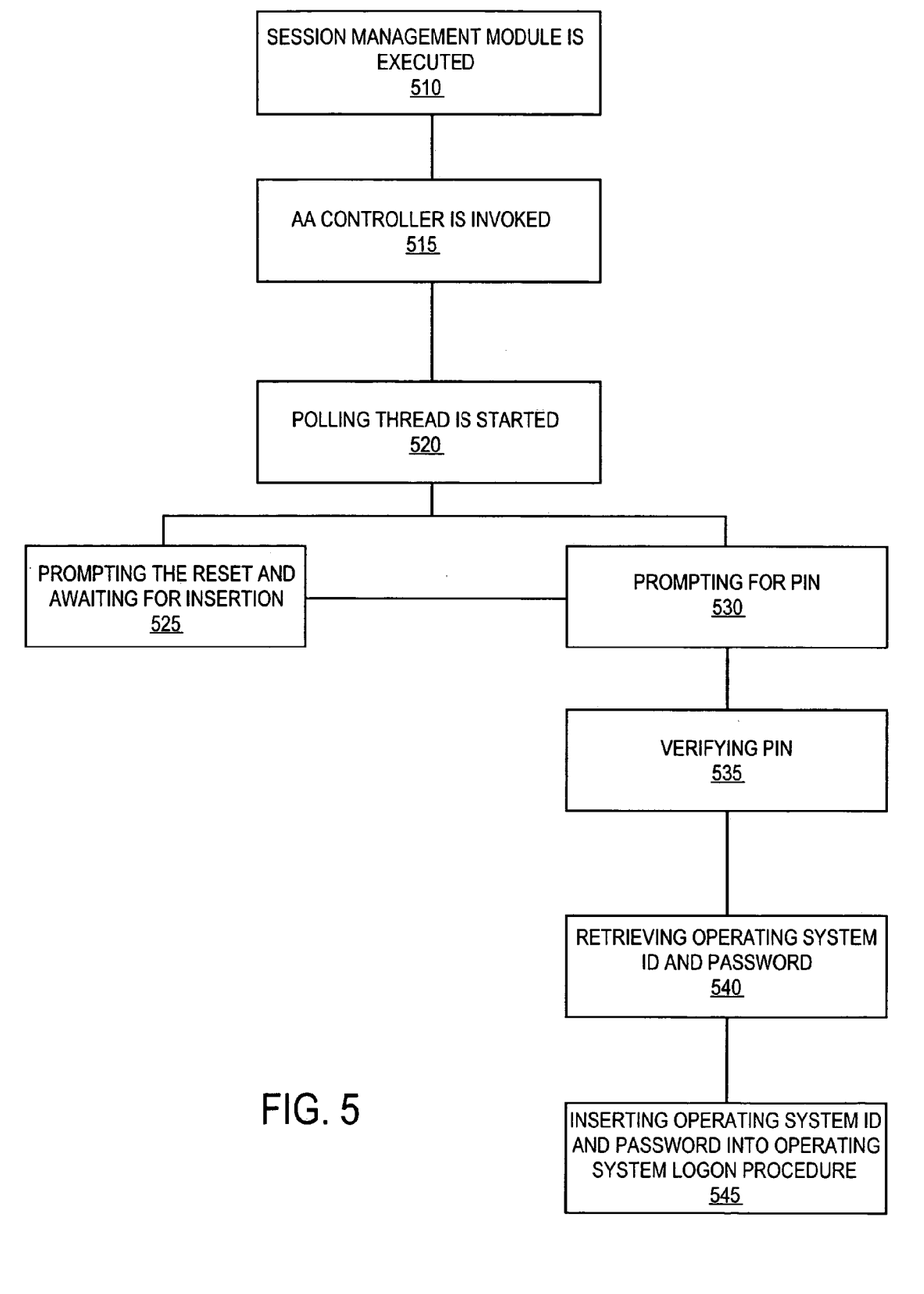
FIG. 5 is a flow chart of a startup procedure according to one embodiment of the invention.

After successful logon, the session management module 230 invokes the user interface module 210, invokes the sniffer module 225 and the synchronization module 245.

SOCI Initialization

In one embodiment upon insertion of the SOCI, a setup program located in the flash memory of the SOCI is executed to determine whether the Access Agent 200 is installed on the client machine. If the Access Agent is not installed on the client machine, the setup program locates the download server to download the access agent installer module. The setup program may contain a default location of the installer module. If the setup program fails to locate the installer for download, the setup program prompts the user for location of the installer or for an insertion of a diskette or CD-ROM including the installer module. Upon installation of the installer, the user is prompted to enter an SOCI personal identification number (PIN) and password. PIN of the SOCI is distributed with the SOCI. User can change the PIN after obtaining access to the SOCI upon entering the original PIN. Upon the user entering the PIN and password, the installer transmits the PIN and password data to the IMS. In one embodiment data transmitted to the IMS includes SOCI identification number retrieved from the SOCI device, SOCI properties, SOCI public keys, encrypted Common Symmetric Key (CSK). Upon receiving the data, the IMS creates a new user account and registers the SOCI with the account. The IMS generates a new certificate and transmits the certificate to the Access Agent which stores the certificate in the SOCI. The IMS may also encrypt the CSK with a key derived from the SOCI password and further encrypt the CSK with the IMS's public key. In one embodiment, the server's public key is stored on a separate secure server, or stored in a hardware key device.

Automated Authentication

In one embodiment the sniffer module 225 of the Access Agent 200 executes in the background at the client machine and identifies user's login, logout, change of password activities and records the procedures in a form of an access script. The access scripts are encrypted and stored in the SOCI and the IMS server. The sniffer module 225 captures operating system messages for various applications and identifies whether any of the captured messages comprise user authentication data. If the sniffer module 225 identifies the user authentication application data for a particular application, the sniffer module 225 stores the information in the SOCI. Upon identifying the user authentication application, the sniffer module 225 generates access scripts to be played back when the user attempts to access an application requiring authentication information. When the user attempts to access the application, the sniffer module 225 determines whether an access script exists for the application. If the access script exists, the sniffer module 225 injects the authentication information into the login procedure of the application. If the access script does not exist, the sniffer module 225 captures the logon information entered by the user and stores the encrypted information in the SOCI and IMS. An access script is an xml-based script that contains information on how to playback authentication information, such as the location of the application in the computer, the name of the application, the buttons to click, etc. An example of an access script is provided below:

```
<AccessScript ASPoint="explorer.exe">
<ASMethod MethodName="explorer.exe-1"
MethodType="login"><ASStep
ID="1"><ASResult>
<WebSignature><PageURL></PageURL>
<UserFieldName></UserFieldName>
<PwdFieldName>
</PwdFieldName>
<ActionFieldName></ActionFieldName></WebSignature>
<WndSignature><WndID/>
<WndTitle>Connect
to</WndTitle><ServerLabel></ServerLabel><UserNameLabel>User
name:</UserNameLabel><PasswordLabel>Password:
</PasswordLabel><New
PasswordLabel></NewPasswordLabel><VerifyPasswordLabel>
</VerifyPasswordLabel><LeftStr>Connect
to</LeftStr><RightStr></RightStr><ServerDlgID/>
<UserNameDlgID/><New
PasswordDlgID/><OkButtonID/></WndSignature>
<ASEvent><Message></Message>
</ASEvent></ASResult></ASStep></ASMethod></AccessScript>
```

In addition, the access script contains information allowing the sniffer module to recognize access points of an application, the class identification of the application, password policies associated with the application, etc.

The sniffer module 225 may also perform a client-side single sign-on, by acting as a single sign on service upon the user inserting the SOCI and entering the PIN to unlock the information stored in the SOCI. The sniffer module 225 plays back credentials to a plurality of applications that the user accesses.

In one embodiment upon identification of user's authentication data, the sniffer module 225 converts the user's authentication data into a stronger form of authentication data to be then presented to the applications that user attempts to access. The conversion of the authentication data may be performed without the user being aware the change. The sniffer module 225 can generate a longer password by adding alpha-numeric characters into the password, for example to the end of the user's password. The sniffer module 225 can also generate a random password to be utilized for user authentication purposes instead of the user's chosen password to ensure higher security levels. The new password is generated base on configurable criteria such as the minimal length, or the inclusion of special characters. In addition, the stronger form of authentication data can be digital certificates, private keys, etc. The request for change of passwords to the application can be performed by either Access Agent or IMS. This is done by supplying both the old password and the new password to the application. Once the application accepts the change and is aware of the new password, Access Agent will store the new password in the form of configuration data encrypted by the CSK. The sniffer [LBK4] module 225 may also request IMS for a digital certificate using a private key stored in the SOCI, This stronger form can be used for user authentication purposes instead of user's password if the application is converted to used public key authentication mechanism. Once again, the procedure of conversion of user's password into a stronger form of authentication credentials may be performed without knowledge of the user. By configuring the Access Agent to periodically and automatically perform the above procedures, user credentials will be more [LBK5]secured, hence they are fortified.

Data Synchronization

In one embodiment the user authentication data and access scripts are stored on SOCI and on the IMS server for a backup. The data on the SOCI and IMS server is identical, unless during one of the update sessions by the sniffer module 225, the server was not accessible due for example, to lack of network connection between the client machine and the IMS server. Also, the data on the server may be updated when the user utilizes a duplicate SOCI, causing the original SOCI not to have the latest copy of the user authentication data. In one embodiment, all the records stored in the SOCI and IMS server are time stamped allowing the synchronization module 245 to determine whether SOCI or IMS server includes the latest data. Upon determining the location of the latest user authentication data, the synchronization module 245 updates the data to ensure identical copies of user authentication data on SOCI and IMS server.

In one embodiment, the user authentication data may be stored on the client machine as software. If an SOCI device is not available, the user may request the stored authentication data from the IMS server. Upon downloading the user authentication information to the client machine, the downloaded data may be used by the Access Agent in a manner described above.

In addition, the data stored at the IMS server may be downloaded to a new SOCI acquired by the user. The information stored in the SOCI to be replaced by the new one is encrypted and uploaded to a server, which may be the IMS server. The original SOCI exports the CSK encrypted using the new SOCI's public key. The new SOCI downloads the encrypted CKS. Once the encryption key is acquired by the new SOCI, the encrypted authentication data is downloaded from IMS to the new SOCI to be decrypted utilizing the encryption key. The new SOCI is therefore able to access the same information as the original SOCI, and is said to host a cloned credential container.

Public/Private Key Authentication

In one embodiment of the invention, SOCIs include public-private key pairs to be registered with a Certificate Authority of IMS. The issued certificate and key pair are stored in the SOCI. When the Access Agent detects an application that has been configured to employ public keys for user authentication, the Access Agent directs the SOCI to perform crypto function to automatically cause the application to provide the user with the access. The private key is stored in the SOCI and is not provided to any application or any user. The SOCI has physical tamper-proof features to ensure that private keys are not released. In one embodiment the private key may be burned into the chip of SOCIs during manufacturing.

In one embodiment administrators of IMS may cause the authentication system to utilize private-public key method without the system users being aware of the change. Due to automatic user authentication, the users need not be aware of the authentication method employed as long as they are provided with the desired application access.

Manual Creation of SOCI Contents

In one embodiment the user authentication data is downloaded to SOCIs from a database manually created by system administrators. System administrators create user name and password data pairs for each user of the system and store the authentication data in a database that may be stored at a server or at a corresponding computer of each user. Upon the user connecting an SOCI to the user's computer, the authentication information from the database stored in the usr's computer is downloaded to the SOCI. Alternatively, system administrators download the created authentication data from the database stored at the server to corresponding SOCIs prior to distributing SOCIs to the users. and upload the created authentication data to a corresponding SOCI for each user.

Single Administrative View

Figure 7:
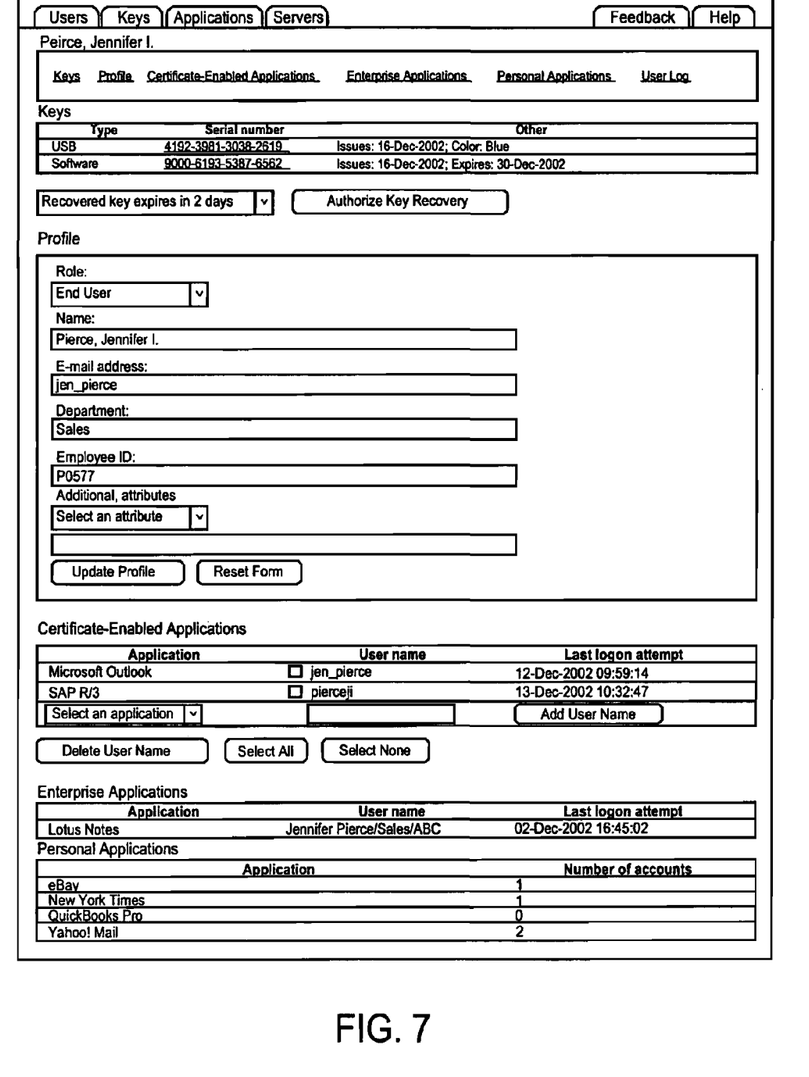
FIG. 7 illustrates a consolidated directory as presented to an administrator according to one embodiment of the present invention.

In one embodiment, the synchronization module of the Access Agent uploads credentials of all applications that the user uses from the user's SOCI to the IMS to ensure that the IMS includes the latest user authentication data. The identifier module of IMS (not shown) identifies applications that user accesses and the view generator module of the IMS (not shown) organizes the uploaded information and presents information about each application to an administrator of user's system upon request. Therefore, a single consolidated user directory can be created that contains user authentication information across a plurality of applications. FIG. 7 illustrates a consolidated directory view as presented to the administrator according to one embodiment of the invention. Directories of each individual application may no longer be necessary because the administrator is able to manage all the applications utilizing the consolidated directory of all the applications accessible by a single user. In one embodiment, the administrator can remove individual user directories and effectively consolidate them into a single user directory.

Utilizing the consolidated directory the administrator is able to remove access to some or all applications that the user is accessing. For example, when an employees leaves an organization, the system administrator may view the consolidated directory of applications of the employee, which shows applications to which the employee had access. The system administrator, using the consolidated directory, may revoke all accounts of the employee by directing the IMS to automatically access each application to which the employee had access to and revoke the accounts.

The administrator is also able to create user accounts in applications and direct the IMS to create accounts in applications and inject authentication information of the newly created accounts into the user's credential container stored on the server. Once the information is stored in the credential container, the Access Agent downloads the information storing it in the user's SOCI and instructs the playback module of the Access Agent to utilize the downloaded information to access the newly created accounts.

The deletion and addition of user accounts may be performed automatically through an interface provided to the administrator. The interface may prompt the administrator for user or users and application or applications identification and direct the system to remove or add the specified user accounts. In addition, the interface may prompt the administrator for new user authentication information to be inserted into user's directory upon its creation.

Session Challenge/Response

In one embodiment, the sniffer module 225 of the Access Agent detects that a web page that a user is attempting to access contains embedded XML tags indicating that the application requires strong authentication through Session Challenge response. The sniffer module 225 contacts the application server to present a certificate. The application issues a challenge to the Access Agent, requiring the Access Agent to digitally sign a random datum with the private key. The Access Agent signs the datum using the information stored in SOCI. The applications returns a session identification to the sniffer module 225 allowing the user to access the application.

It will be appreciated that user authentication information does not have to be stored in a hardware token, such as SOCI, but maybe stored in a database located at a server. In addition, it will be appreciated that user authentication information does not need to be converted into a stronger form of authentication and original user authentication information can be played back by the sniffer module 225.

Thus, a method and apparatus for user authentication have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method, in a data processing system, for providing a system administrator with a view of a plurality of applications accessible by a user, comprising:

receiving, in the data processing system, in response to a coupling of a separate hardware security device to the data processing system, credential information comprising user names and associated passwords for each application of the plurality of applications that the user uses, from the separate hardware security device into an authentication credential container associated with the user;

identifying, by the data processing system, the plurality of applications accessible by the user by examining the authentication credential container associated with the user;

generating, by the data processing system, a view of the plurality of applications accessible by the user, wherein the view is a consolidated user directory that contains user authentication information across the plurality of applications;

displaying, by the data processing system, the view to the administrator;

creating a user account for a new application to be accessible by the user utilizing the generated view which comprises authentication information across the plurality of applications that the user uses;

injecting authentication information of the user account into the authentication credential container of the user; and injecting the authentication information of the user account into the separate hardware security device.

2. The method of claim 1 further comprising removing access to an application from the plurality of the applications by utilizing the view of the plurality of the applications accessible by the user.

3. The method of claim 1 wherein the authentication credential container is stored at a server.

4. The method of claim 2 wherein the removing is performed automatically.

5. The method of claim 1 wherein the creating the user account is performed either automatically or manually by an administrator.

6. The method of claim 1 further comprising removing individual user directories for each application of the plurality of the applications accessible by the user.

7. The method of claim 1, wherein the view comprises:

a list of keys employed by the user, wherein each entry in the list corresponds to a different key employed by the user, and wherein each entry identifies a type of the corresponding key and a serial number of the corresponding key.

8. The method of claim 1, wherein the view comprises:

a profile of the user detailing a role of the user, a name of the user, contact information for the user, and employment information for the user.

9. The method of claim 1, wherein the view comprises:

a list of certificate-enabled applications accessible by the user, wherein each entry in the list corresponds to a different certificate-enabled application, and wherein each entry identifies a user name of the user and a last login attempt of the user for the corresponding certificate-enabled application.

10. The method of claim 1, wherein the view comprises:

a list of enterprise applications accessible by the user, wherein each entry in the list corresponds to a different enterprise application, and wherein each entry identifies a user name of the user and a last login attempt of the user for the corresponding enterprise application.

11. The method of claim 1, wherein the view comprises:

a list of personal applications accessible by the user, wherein each entry in the list corresponds to a different personal application, and wherein each entry identifies a number of accounts connected to the corresponding personal application.

12. The method of claim 8, wherein the view comprises:

user selectable graphical user interface elements for invoking a function to update the profile and for invoking a function to reset the profile.

13. The method of claim 9, wherein the view comprises:

a user selectable graphical user interface element for invoking a function to delete a user name of the user from the list of certificate-enabled applications.

14. A method, in a data processing system, for providing a system administrator with a list of a plurality of applications accessible by a user together with any user names and passwords used in connection with those applications, comprising:

receiving, in the data processing system, in response to a coupling of a separate hardware security device to the data processing system, credential information comprising user names and associated passwords for each application of a plurality of applications that the user uses, from the separate hardware security device into an authentication credential container associated with the user;

identifying, by the data processing system, the plurality of applications accessible by the user and user names and passwords used in connection with the plurality of applications by examining an authentication credential container associated with the user;

generating, by the data processing system, a list of the plurality of applications accessible by the user together with any user names and passwords used in connection with the plurality of applications;

displaying, by the data processing system, the view to the administrator;

creating a user account for a new application to be accessible by the user utilizing the generated view which comprises authentication information across the plurality of applications that the user uses;

injecting authentication information of the user account into the authentication credential container of the user; and injecting the authentication information of the user account into the separate hardware security device.

15. A computer program product comprising a non-transitory computer recordable medium having a computer readable program recorded thereon, wherein the computer readable program, when executed on a data processing system, causes the data processing system to:

receive, in response to a coupling of a separate hardware security device to the data processing system, credential information comprising user names and associated passwords for each application of the plurality of applications that the user uses, from the separate hardware security device into an authentication credential container associated with the user;

identify the plurality of applications accessible by the user by examining the authentication credential container associated with the user;

generate a view of the plurality of applications accessible by the user, wherein the view is a consolidated user directory that contains user authentication information across the plurality of applications;

display the view to the administrator;

create a user account for a new application to be accessible by the user utilizing the generated view which comprises authentication information across the plurality of applications that the user uses;

inject authentication information of the user account into the authentication credential container of the user; and inject the authentication information of the user account into the separate hardware security device.

16. The computer program product of claim 15, wherein the computer readable program further causes the data processing system to remove access to an application from the plurality of the applications by utilizing the view of the plurality of the applications accessible by the user.

17. The computer program product of claim 15, wherein the view comprises at least one of:
- a list of certificate-enabled applications accessible by the user, wherein each entry in the list corresponds to a different certificate-enabled application, and wherein each entry identifies a user name of the user and a last login attempt of the user for the corresponding certificate-enabled application;
- a list of enterprise applications accessible by the user, wherein each entry in the list corresponds to a different enterprise application, and wherein each entry identifies a user name of the user and a last login attempt of the user for the corresponding enterprise application;
- a list of personal applications accessible by the user, wherein each entry in the list corresponds to a different personal application, and wherein each entry identifies a number of accounts connected to the corresponding personal application;
- user selectable graphical user interface elements for invoking a function to update the profile and for invoking a function to reset the profile; or
- a user selectable graphical user interface element for invoking a function to delete a user name of the user from the list of certificate-enabled applications.

* * * * *